(12) United States Patent
Erimli et al.

(10) Patent No.: US 6,990,114 B1
(45) Date of Patent: Jan. 24, 2006

(54) SYSTEM AND METHOD FOR DECIDING OUTGOING PRIORITY FOR DATA FRAMES

(75) Inventors: Bahadir Erimli, Campbell, CA (US); Peter Ka-Fai Chow, San Jose, CA (US); Yatin R. Acharya, Sunnyvale, CA (US); Shr-Jie Tzeng, Fremont, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 961 days.

(21) Appl. No.: 09/816,337

(22) Filed: Mar. 26, 2001

(51) Int. Cl.
*H04L 12/56* (2006.01)
(52) U.S. Cl. .................... 370/412; 370/428
(58) Field of Classification Search .............. 370/412, 370/413, 428, 429, 443
See application file for complete search history.

(56) References Cited

U.S. PATENT DOCUMENTS

| | | | |
|---|---|---|---|
| 5,594,702 A | * | 1/1997 | Wakeman et al. ..... 365/230.05 |
| 6,466,580 B1 | * | 10/2002 | Leung ................. 370/412 |
| 6,683,879 B1 | * | 1/2004 | Kado ................ 370/395.4 |
| 6,700,869 B1 | * | 3/2004 | Falco et al. .......... 370/230 |
| 6,751,194 B1 | * | 6/2004 | Ueno .................. 370/235 |

* cited by examiner

*Primary Examiner*—Chi Pham
*Assistant Examiner*—Blanche Wong
(74) *Attorney, Agent, or Firm*—Harrity & Snyder LLP (57) ABSTRACT

A network device includes a port filter, a first logic device, and a second logic device. The port filter receives a data frame and generates first data relating to the data frame. The first logic device generates second data for the received data frame. The second logic device receives the first data and the second data, determines whether the first data contains a valid first priority value, and assigns the valid first priority value to the data frame when the first data contains the valid first priority value. When the first data does not contain a valid first priority value, the second logic device determines whether the second data contains a valid second priority value, and assigns the valid second priority value to the data frame when the second data contains the valid second priority value.

19 Claims, 5 Drawing Sheets

SYSTEM AND METHOD FOR DECIDING OUTGOING PRIORITY FOR DATA FRAMES

TECHNICAL FIELD

The present invention relates generally to communication systems and, more particularly, to a system and method for assigning priorities to data frames.

BACKGROUND ART

In computer networks, a number of network stations are typically interconnected via a communications medium. For example, Ethernet 802.3 is a commonly used local area network (LAN) scheme in which multiple stations are connected to a shared or dedicated serial data path. These stations often communicate with a switch or some other network device located between the data path and the stations connected to that path. The switch typically controls the communication of packets and includes logic for receiving and forwarding packets to their appropriate destinations.

Currently, when a switch receives a data frame, different levels of priority may be assigned to the data frame by different logic devices within the switch. As a result, the switch may incorrectly assign a low priority indication to a high priority data frame, and vice versa.

DISCLOSURE OF THE INVENTION

There exists a need for a mechanism that improves priority assignments in a network device. This and other needs are met by the present invention, where local hardware, under software control when needed, determines a priority level for a data frame when different levels of priority have been assigned to the data frame.

Additional advantages and other features of the invention will be set forth in part in the description that follows and in part will become apparent to those having ordinary skill in the art upon examination of the following or may be learned from the practice of the invention. The advantages and features of the invention may be realized and obtained as particularly pointed out in the appended claims.

According to the present invention, the foregoing and other advantages are achieved in part by a network device that includes a port filter, a first logic device, and a second logic device. The port filter receives a data frame and generates first data relating to the data frame. The first logic device generates second data for the received data frame. The second logic device receives the first data and the second data, determines whether the first data contains a valid first priority value, and assigns the valid first priority value to the data frame when the first data contains the valid first priority value. When the first data does not contain a valid first priority value, the second logic device determines whether the second data contains a valid second priority value, and assigns the valid second priority value to the data frame when the second data contains the valid second priority value.

In another implementation consistent with the present invention, a system for assigning a priority to a data frame includes a group of receiver modules, first logic, a group of registers that correspond to the receiver modules, and second logic. The receiver modules receive packets and generate first data relating to the packets. The first logic generates second data for the packets. The registers store the first and second data for the packets received by the corresponding receiver modules. The second logic determines, for each of the packets, whether the first data includes a priority indication and assigns the priority indication to the packet when the first data includes a priority indication. When the first data is determined not to include the priority indication, the second logic determines whether the second data includes a priority indication, assigns the priority indication from the second data to the packet when the second data is determined to include the priority indication, and assigns a low priority indication to the packet when the second data is determined not to include the priority indication.

Other advantages and features of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, where elements having the same reference number designation represent like elements throughout.

BEST MODE FOR CARRYING OUT THE INVENTION

The present invention will be described with the example of a switch in a packet switched network, such as an Ethernet (IEEE 802.3) network. It will become apparent, however, that the present invention is also applicable to other packet switched systems, as described in detail below, as well as to other types of systems in general.

Switch Architecture Overview

Figure 1:
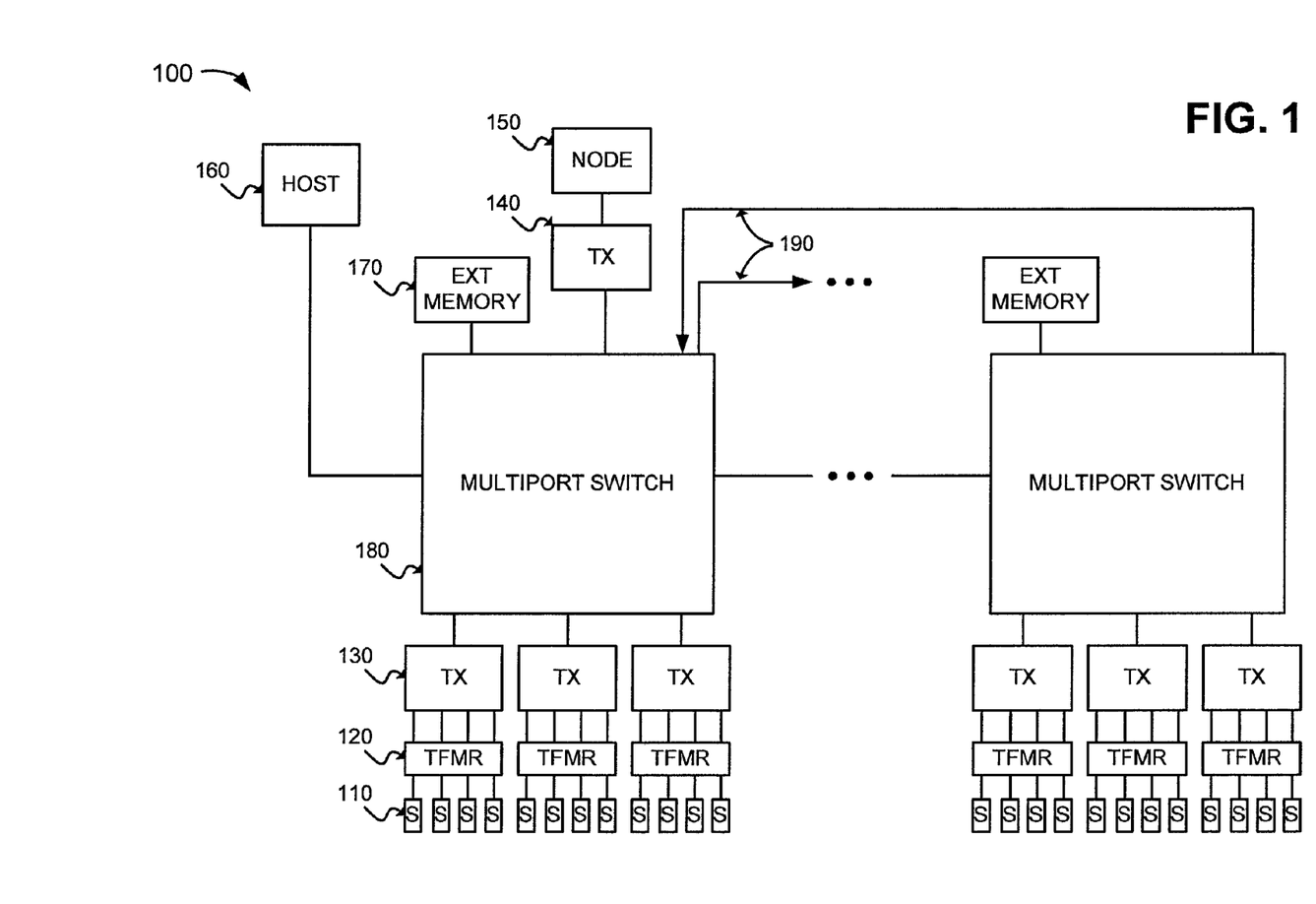
FIG. 1 is a block diagram of an exemplary system in which a system and method consistent with the present invention may be implemented.

FIG. 1 is a block diagram of an exemplary system in which systems and methods consistent with the present invention may be implemented. The exemplary system may include a packet switched network 100, such as an Ethernet (IEEE 802.3) network. The packet switched network 100 may include network stations 110, transformers 120, transceivers 130 and 140, a network node 150, a host 160, external memories 170, and multiport switches 180.

The network stations 110 may include conventional communication devices, such as computers, with different configurations. For example, the devices may send and receive data at network data rates of 10 megabits per second (Mb/s) or 100 Mb/s.

Each 10/100 Mb/s network station 110 may send and receive data to and from a multiport switch 180 according to either a half-duplex or full duplex Ethernet protocol. The Ethernet protocol ISO/IEC 8802-3 (ANSI/IEEE Std. 802.3, 1993 Ed.) defines a half-duplex media access mechanism that permits all stations 110 to access the network channel with equality. Traffic in a half-duplex environment may not be distinguished over the transmission medium. Rather, each half-duplex station 110 may include an Ethernet interface card that uses carrier-sense multiple access with collision detection (CSMA/CD) to listen for traffic on the transmission medium. The absence of network traffic is detected by sensing deassertion of a receive carrier on the transmission medium.

Any station 110 having data to send may attempt to access the channel by waiting a predetermined amount of time, known as the interpacket gap interval (IPG), after deassertion of the receive carrier on the transmission medium. If multiple stations 110 are connected to the same link, each of the stations 110 may attempt to transmit data in response to the sensed deassertion of the receive carrier and after the IPG interval, possibly resulting in a collision. Hence, the transmitting station 110 may monitor the transmission medium to determine if there has been a collision due to another station 110 sending data on the same link at the same time. If a collision is detected, both stations 110 cease transmitting, wait a random amount of time, and then retry the transmission.

The 10/100 Mb/s network stations 110 that operate in full duplex mode may send and receive data packets according to the Ethernet standard IEEE 802.3u. The full duplex environment provides a two-way, point-to-point communication link enabling simultaneous transmission and reception of data packets between each link partner (i.e., the 10/100 Mb/s network station 110 and the corresponding multiport switch 180).

The transformers 120 may include magnetic transformers that provide AC coupling between the network stations 110 and the transceivers 130. The transceivers 130 may include 10/100 Mb/s physical layer transceivers that communicate with the multiport switches 180 via respective serial media independent interfaces (SMIIs) or reduced media independent interfaces (RMIIs). Each of the transceivers 130 may be configured to send and receive data packets between the multiport switch 180 and up to four network stations 110 via the SMII/RMII. The SMII/RMII may operate at a data rate sufficient to enable simultaneous transmission and reception of data packets by each of the network stations 110 and the corresponding transceiver 130.

The transceiver 140 may include one or more 1000 Mb/s (i.e., 1 Gb/s) physical layer transceivers that provide communication with nodes, such as the network node 150, via, for example, a high speed network transmission medium. The network node 150 may include one or more 1 Gb/s network nodes that send and receive data packets at a network speed of 1 Gb/s. The network node 150 may include, for example, a server or a gateway to a high-speed backbone network.

The host 160 may include a computer device that provides external management functions to control the overall operation of the multiport switches 180. The external memories 170 may include synchronous static random access memories (SSRAMs) that provide external storage for the multiport switches 180. Each of the external memories 170 may include a Joint Electron Device Engineering Council (JEDEC) pipelined burst or Zero Bus Turnaround (ZBT) SSRAM having a 64-bit wide data path and a 17-bit wide address path. The external memories 170 may be addressable as upper and lower banks of 128K in 64-bit words. The size of the external memories 170 is preferably at least 1 Mbyte with data transfers possible on every clock cycle through pipelining.

The multiport switches 180 selectively forward data packets received from the network stations 110 or the network node 150 to the appropriate destination according to the appropriate transmission protocol, such as the Ethernet protocol. The multiport switches 180 may be cascaded together (via lines 190) to expand the capabilities of the multiport switches 180.

Figure 2:
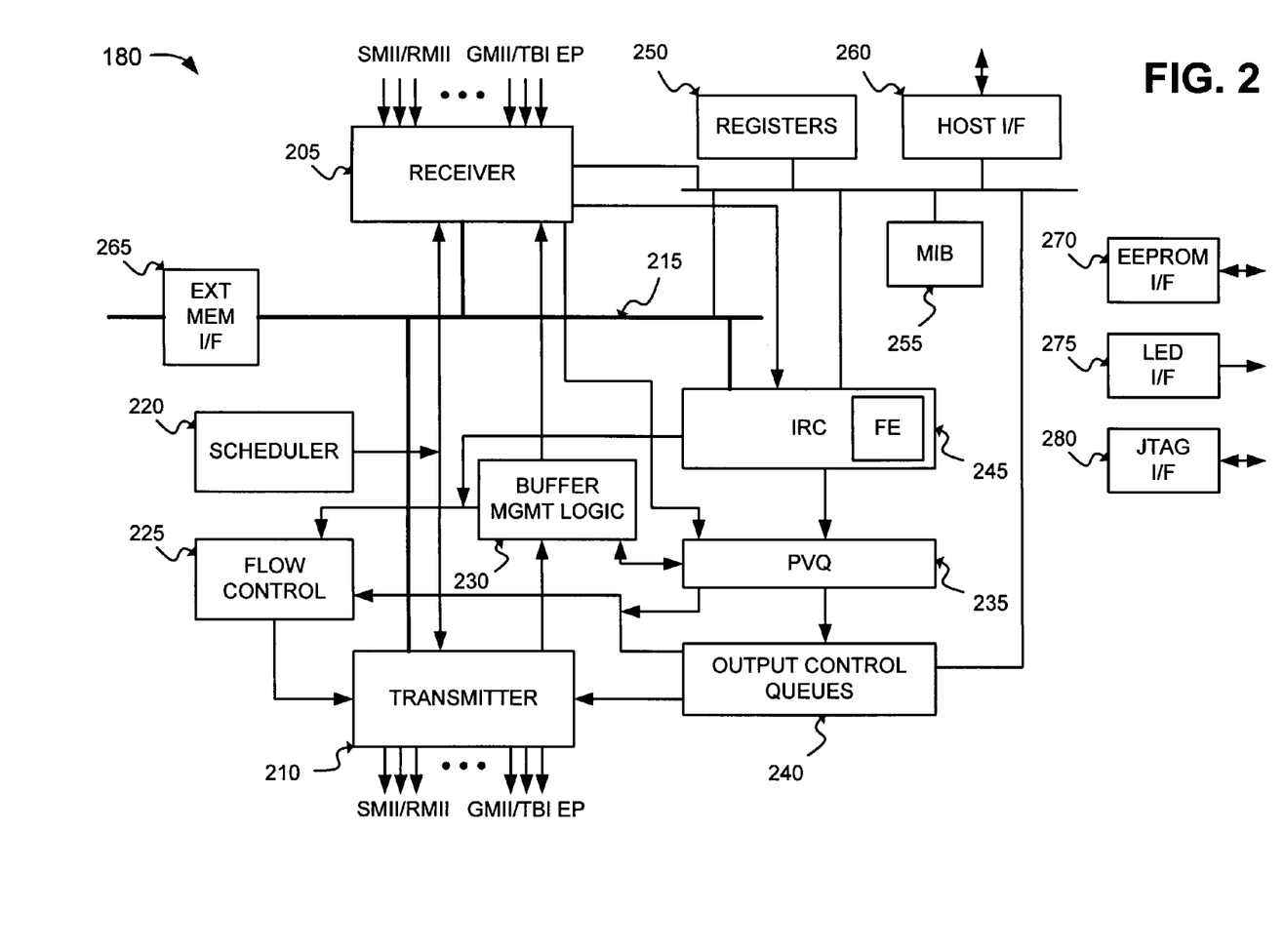
FIG. 2 is a detailed diagram of the multiport switch of FIG. 1 according to an implementation consistent with the present invention.

FIG. 2 is a detailed diagram of the multiport switch 180 according to an implementation consistent with the present invention. The multiport switch 180 may include a receiver 205, a transmitter 210, a data bus 215, a scheduler 220, flow control logic 225, buffer management logic 230, a port vector queue (PVQ) 235, output control queues 240, an internal rules checker (IRC) 245, registers 250, management information base (MIB) counters 255, a host interface 260, an external memory interface 265, an EEPROM interface 270, an LED interface 275, and a Joint Test Action Group (JTAG) interface 280.

The receiver 205 may include media access control (MAC) modules and receive buffers, such as first-in, first-out (FIFO) buffers. The receive modules may include input ports that support SMIIs, RMIIs, gigabit media independent interfaces (GMIIs), ten bit interfaces (TBIs), and proprietary interfaces for expansion with other multiport switches 180 (FIG. 1). The expansion ports (EPs) may be used to transfer data between other multiport switches 180 according to a prescribed protocol. The expansion ports may permit the multiport switches 180 to be cascaded together to form a backbone network. Each of the receive modules may include queuing logic that receives data packets from the network stations 110 and/or network node 150 and stores the packets in the corresponding receive FIFOs. The queuing logic may then send portions of the packets to the IRC 245 for processing and to the external memory 170 for storage via the external memory interface 265.

The transmitter 210 may include MAC modules and transmit buffers, such as FIFO buffers. The transmit modules may include output ports that support SMIIs, GMIIs, TBIs, and proprietary interfaces for expansion with other multiport switches 180. Each of the transmit modules may include dequeuing logic that obtains packets from the external memory 170 and stores the packets in the corresponding transmit FIFOs. The transmit modules may read the data packets from the corresponding transmit FIFOs and transmit the packets to the network stations 110 and/or network node 150. In an alternative implementation consistent with the present invention, the functions of the receiver 205 and transmitter 210 may be performed by a transceiver that manages both the receiving and transmitting of data packets.

The data bus 215 may include one or more conductors that connect the receiver 205, the transmitter 210, the IRC 245, and the external memory interface 265. The scheduler 220 may include logic that controls access to the external memory 170 by the queuing and dequeuing logic of the receiver 205 and transmitter 210, respectively. The multiport switch 180 is configured to operate as a non-blocking switch, where network data is received and transmitted from the switch ports at the respective wire rates of 10, 100, or 1000 Mb/s. Hence, the scheduler 220 may control the access by different ports to optimize use of the bandwidth of the external memory 170.

The flow control logic 225 may include logic that operates in conjunction with the buffer management logic 230, the PVQ 235, and the output control queues 240 to control the transmission of packets by the transmitter 210. The flow control logic 225 may control the transmitter 210 so that the transmitter 210 outputs packets in an efficient manner based on the volume of data traffic. The buffer management logic 230 may include logic that oversees the use of memory within the multiport switch 180. For example, the buffer management logic 230 may manage the use of frame pointers and the reuse of frame pointers once the data packet has been transmitted to its designated output port(s). Frame pointers identify the location of data frames stored in the external memory 170 that require transmission.

The PVQ 235 may include logic that obtains a frame pointer to the appropriate output queue(s) in output control queues 240 that correspond to the output ports to receive the data frame transmission. For multicopy frames, the PVQ 235 may supply multiple copies of the same frame pointer to more than one output queue. The output control queues 240 may include a FIFO-type output queue corresponding to each of the transmit modules in the transmitter 210. Each of the output queues may include multiple priority queues for frames having different levels of priority. For example, a high priority queue may be used for frames that require a lower access latency (e.g., frames for multimedia applications or management frames). The frame pointers stored in the FIFO-type output queues may be processed by the dequeuing logic for the respective transmit modules. The dequeuing logic uses the frame pointers to access the external memory 170 to read data frames at the memory locations specified by the frame pointers.

The IRC 245 may include an internal decision making engine (also known as a forwarding engine (FE)) that makes frame forwarding decisions for data packets that are received by the receiver 205. The IRC 245 may monitor (i.e., "snoop") the data bus 215 to determine the frame pointer value and a part of the data frame, for example, the header information of a received packet, including the source, destination, and virtual local area network (VLAN) address information. The IRC 245 may use the header information to determine which output port will output the data frame stored at the location specified by the frame pointer. The IRC 245 may, thus, determine that a given data frame should be output by either a single port (i.e., unicast), multiple ports (i.e., multicast), all ports (i.e., broadcast), or no port (i.e., discarded).

For example, each data frame may include a header that identifies the source and destination addresses. The IRC 245 may use the destination address to identify the appropriate output port to output the data frame. The frame header may also include VLAN address information that identifies the frame as information destined to one or more members of a group of network stations 110. The IRC 245 may alternatively determine that a data frame should be transferred to another multiport switch 180 via the expansion port.

Therefore, the IRC 245 determines whether a frame temporarily stored in the external memory 170 should be output to a single output port, multiple output ports, no output port, or another multiport switch 180. The IRC 245 may make its forwarding decision based on information stored in an IRC address table.

The IRC 245 may output its forwarding decision to the PVQ 235 in the form of a forwarding descriptor. The forwarding descriptor may include, for example, a priority class identifying whether the data frame is high priority or low priority, a port vector identifying each output port that should transmit the frame, the input port number, or VLAN information. The PVQ 235 may decode the forwarding descriptor to obtain the frame pointer. The PVQ 235 may then supply the frame pointer to the appropriate output queues within the output control queues 240.

The IRC 245 may also perform layer 3 filtering. For example, the IRC 245 may examine each received data packet for up to 128 programmable patterns and process the packet based on the result. The result may dictate that the IRC 245 drop the packet, forward the packet to the host 160, or assign a user priority or a Differentiated Services Code Point (DSCP) to the packet. User priorities and the DSCP may be independently mapped into output priority classes.

The registers 250 may include configuration and status registers used by the host interface 260. The MIB counters 255 may provide statistical network information in the form of MIB objects for use by the host 160. The host interface 260 may include a standard interface that permits an external management entity, such as the host 160, to control the overall operation of the multiport switch 180. The host interface 260 may decode host accesses within a prescribed register space and read and write configuration and status information to and from the registers 250. The registers 250, MIB counters 255, host interface 260, receiver 205, data bus 215, output control queues 240, and IRC 245 may be connected via a host bus 262.

The external memory interface 265 may include a standard interface that permits access to the external memory 170. The external memory interface 265 may permit external storage of packet data in the external memory 170 in a direct memory access (DMA) transaction during an assigned time slot determined by the scheduler 220. In an implementation consistent with the present invention, the external memory interface 265 operates at a clock frequency of at least 66 MHz and, preferably, at a frequency of 100 MHz or above.

The EEPROM interface 270 may include a standard interface to another external memory, such as an EEPROM. The LED interface 275 may include a standard interface to external LED logic. The LED interface 275 may send the status of conditions of the input and output ports to the external LED logic. The LED logic may drive LED display elements that are human-readable. The JTAG interface 280 may include a standard interface to external testing equipment to permit, for example, a boundary scan test to be performed on the multiport switch 180.

The foregoing description of the switch architecture provides an overview of the switch operations in a packet switched network. A more detailed description of the features of the present invention as embodied, for example, in the multiport switch 180 is provided below.

Exemplary Implementation

The present invention is directed to logic that operates upon entries in the PVQ 235 to determine priorities of data frames of packets received by the multiport switch 180.

Figure 3:
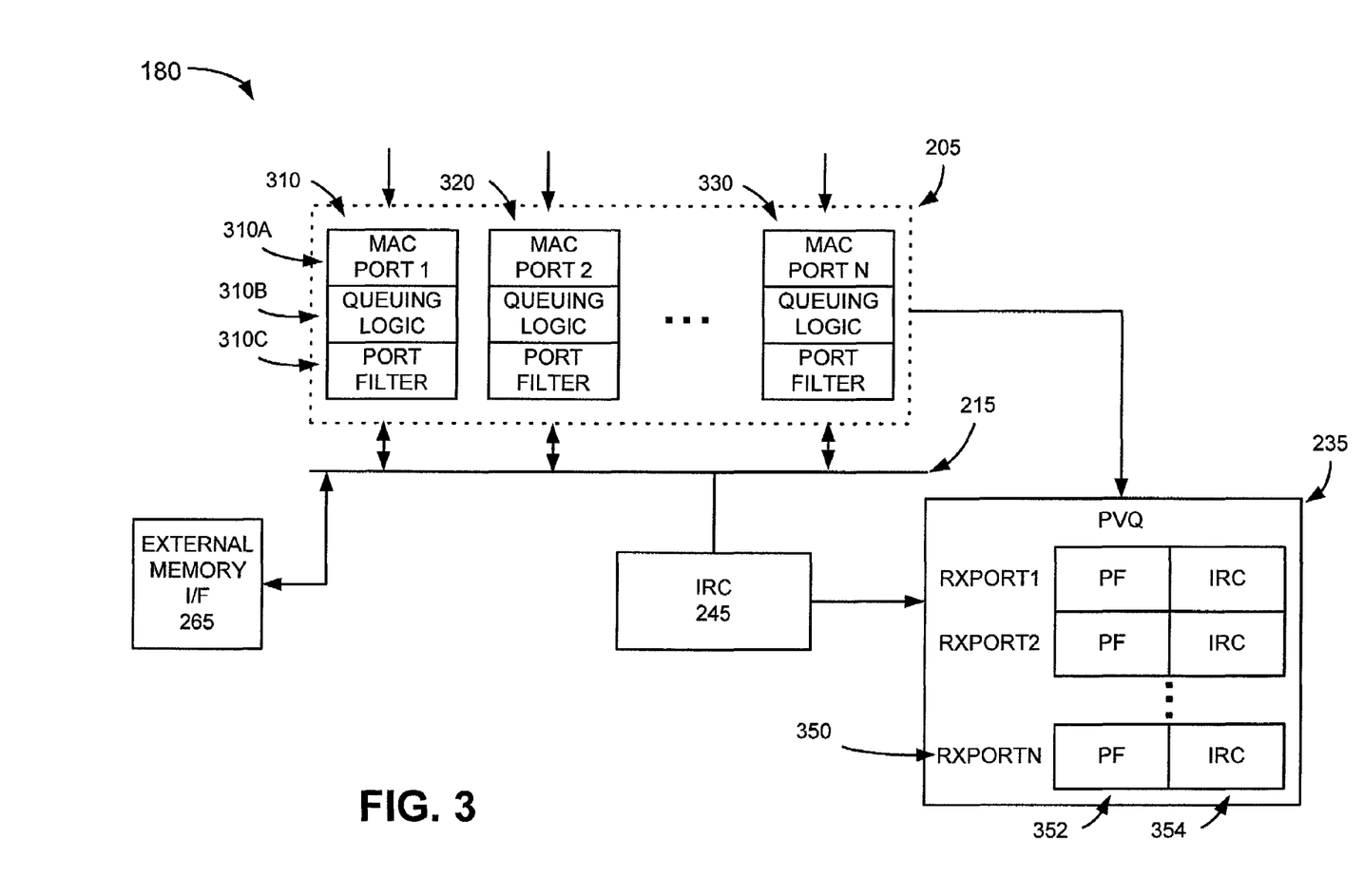
FIG. 3 is a detailed diagram of a portion of the multiport switch according to an implementation consistent with the present invention.

FIG. 3 is a detailed diagram of a portion of the multiport switch 180 according to an implementation consistent with the present invention. The portion of the multiport switch 180 shown in FIG. 3 includes the receiver 205, the data bus 215, the PVQ 235, the IRC 245, and the external memory interface 265. The receiver 205 may include MAC modules 310, 320, and 330 corresponding to input ports 1 through N, respectively. Each MAC module may include a receive FIFO buffer, queuing logic, and a port filter. For example, referring to FIG. 3, MAC module 310 may include a receive FIFO buffer 310A, queuing logic 310B, and port filter 310C.

The other MAC modules may similarly include receive FIFO buffers, queuing logic, and port filters.

The receive FIFO buffer 310A may include a FIFO that temporarily buffers data frames received on the corresponding input port. The queuing logic 310B may include logic responsible for transferring data frames from the receive FIFO buffer 310A to the external memory 170 (FIG. 1) via the external memory interface 265. The port filter 310C may include logic for determining a priority associated with a received data frame. The port filter 310C may generate its results in the format <Tag-Hit, PF Frame Pointer, PF Tag> ("tag data") and send the results to the PVQ 235. The Tag-Hit indicates whether the PF Frame Pointer and PF Tag contain valid data, the PF Frame Pointer identifies the location of the data frame in memory, such as external memory 170, and the PF Tag, among other things, identifies the priority of the data frame.

In an exemplary implementation of the present invention, the port filter 310C categorizes data frames as having either a high priority or a low priority. A high priority data frame may include a data frame that requires lower access latency, such as a data frame destined for a management device or a data frame for a multimedia application. A low priority data frame may include any other data frame. In alternative implementations, the number of priorities associated with the data frame may be greater than two. For example, the multiport switch 180 may identify data frames having one of three levels of priority, such as low, medium and high.

In addition, in some implementations of the present invention, the multiport switch 180 may receive data frames having a priority indication. For example, an Ethernet data frame may include a three-bit field representing one of eight levels of priority. In this case, the port filter 310C on multiport switch 180 may map the received priority information to a corresponding priority level supported by the multiport switch 180. For example, the eight levels of priority may be mapped to either high or low priority on the multiport switch 180. Alternatively, the eight levels of priority associated with the received data frame may be mapped to three or more levels of priority on the multiport switch 180.

As described previously, the IRC 245 determines which output port will transmit a received data frame. The IRC 245 may determine that a given data frame should be transmitted at a single port, multiple ports, all ports, or no ports. The IRC 245 may generate its results in the format <RC-Hit, IRC Frame Pointer, IRC Port Vector, IRC Priority> ("IRC data") and send the results to the PVQ 235. The IRC-Hit identifies whether the IRC Frame Pointer, IRC Port Vector, and IRC priority contain valid data, the IRC Frame Pointer identifies the location of the data frame in memory, such as external memory 170, the IRC Port Vector identifies the output port(s) from which the data frame is to be transmitted, the IRC Priority identifies the priority of the data frame.

The PVQ 235 may include multiple registers 350 corresponding to the MAC modules 310–330 (i.e., the receive ports) and logic for controlling the reading and writing of the registers 350. For example, the PVQ 235 may include one register 350 for each MAC module 310–330. The register 350 may include a port filter buffer 352 and an IRC buffer 354. The port filter buffer 352 may store tag data received from the port filter 310C. The IRC buffer 354 may store IRC data received from the IRC 245.

Figure 4:
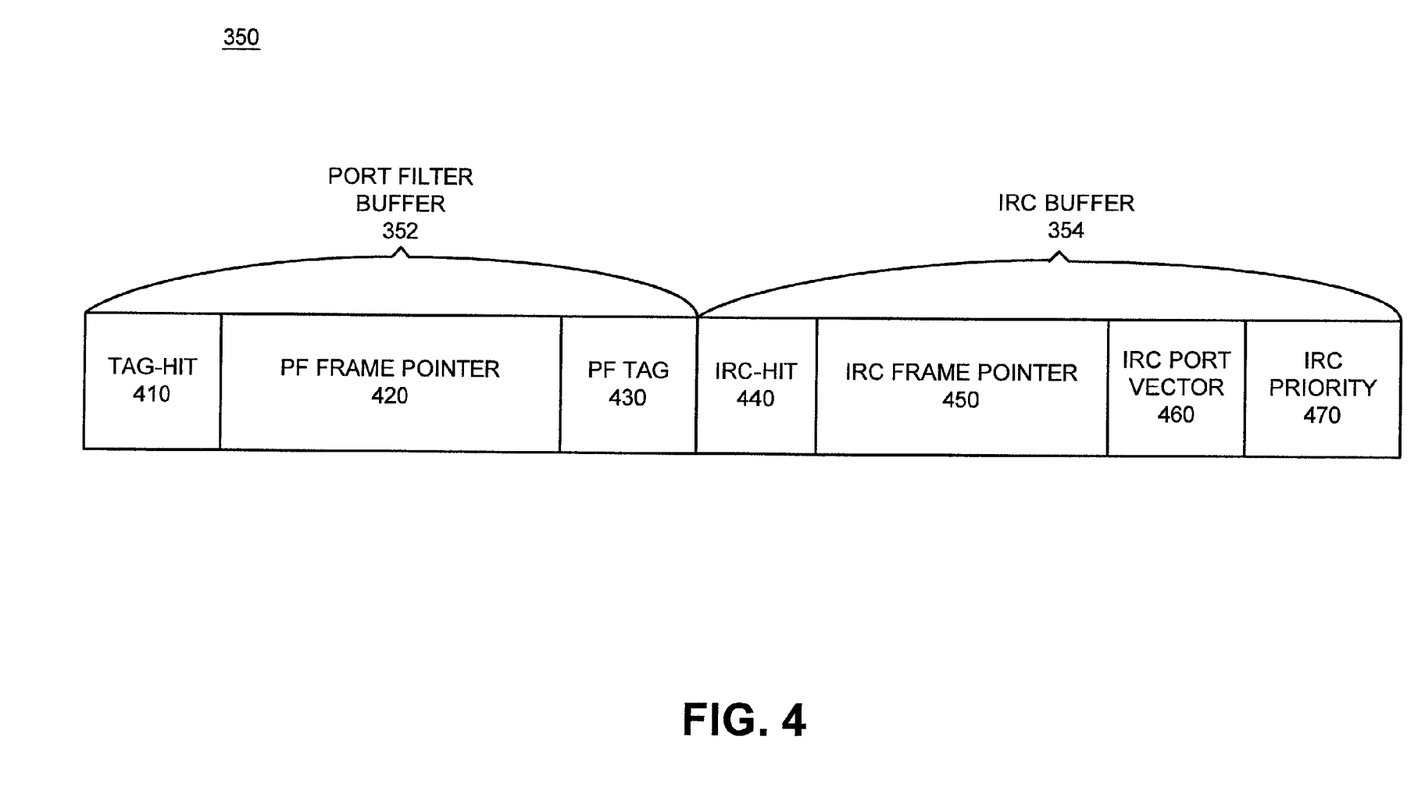
FIG. 4 is an exemplary diagram of the register of FIG. 3 according to an implementation consistent with the present invention.

FIG. 4 is an exemplary diagram of the register 350 according to an implementation consistent with the present invention. As described previously, the register 350 may include the port filter buffer 352 and the IRC buffer 354. The port filter buffer 352 may include a tag-hit field 410, a PF frame pointer field 420, and a port filter (PF) tag field 430. The tag-hit field 410 may store data that indicates whether the PF frame pointer field 420 and the PF tag field 430 contain valid data. The PF frame pointer field 420 may store data that identifies the location of the data frame in external memory 170. The PF tag field 430 may store priority information for a data frame.

The IRC buffer 354 may include an IRC-hit field 440, an IRC frame pointer field 450, an IRC port vector field 460, and an IRC priority field 470. The IRC-hit field 440 may store data that indicates whether the IRC frame pointer field 450, the IRC port vector field 460, and the IRC priority field 470 contain valid data. The IRC frame pointer field 450 may store data that identifies the location of the data frame in external memory 170. The IRC port vector field 460 may store information that identifies an output port for a data frame. The IRC priority field 470 may store information indicating the priority of the data frame.

Exemplary Processing

Figure 5:
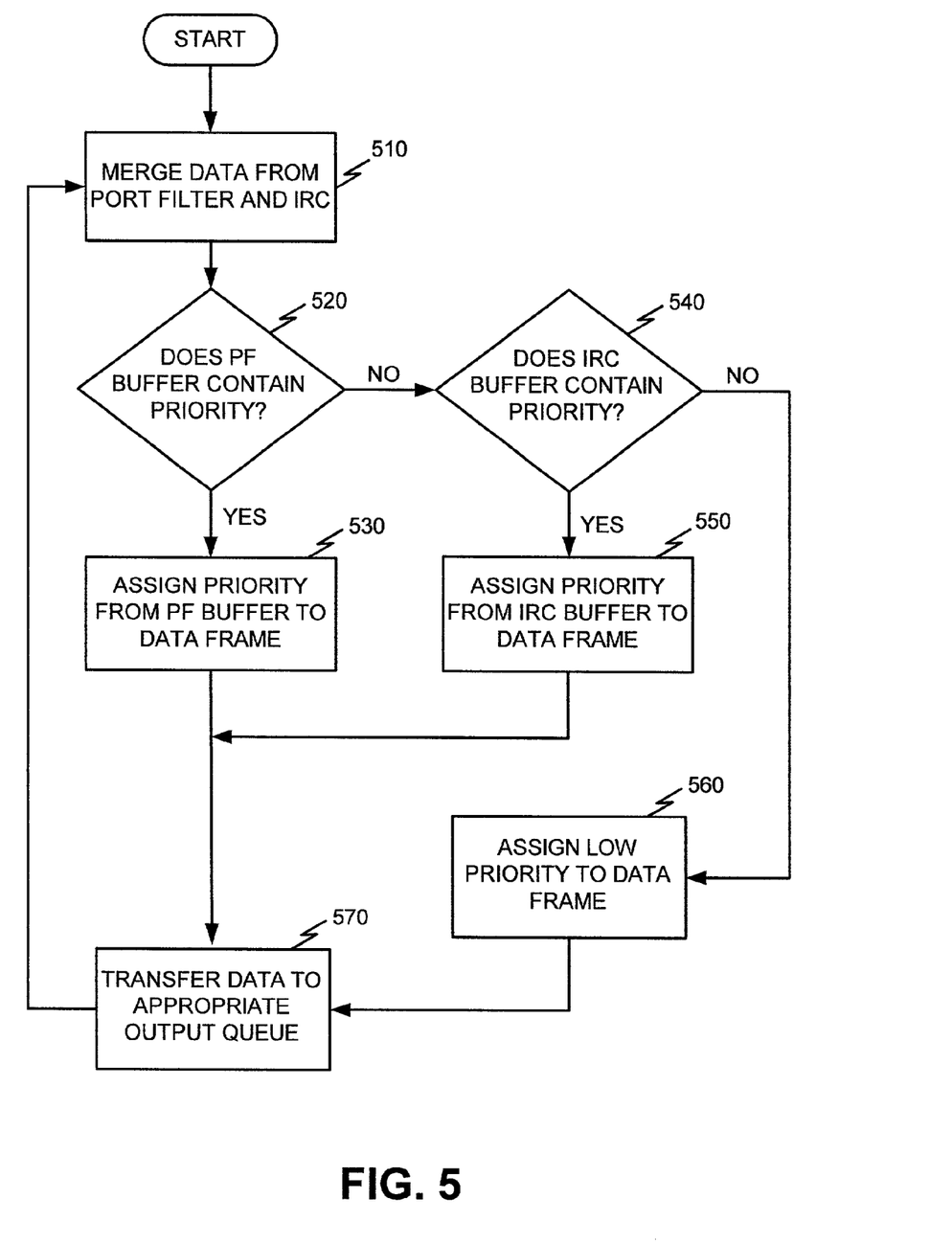
FIG. 5 is a flowchart of exemplary processing for determining priorities for data frames received by a network device according to an implementation consistent with the present invention.

FIG. 5 is a flowchart of exemplary processing for determining priorities for data frames received by a network device according to an implementation consistent with the present invention. Processing may begin with a PVQ, such as PVQ 235, receiving data from a port filter, such as port filter 310C, and the IRC 245 [act 510]. As described above, the PVQ 235 may receive a tag-hit indication 410, a PF frame pointer 420, and a PF tag 430 from the port filter 310C and an IRC-hit indication 440, an IRC frame pointer 450, an IRC port vector 460, and IRC priority information 470 from the IRC 245. Upon receipt of the data, the PVQ 235 may merge the data from the port filter 310C and the IRC 245 into the register 350 corresponding to the port through which the corresponding data frame was received.

To determine the priority that is to be assigned to the data frame, the PVQ 235 may first determine whether the PF buffer 352 contains a valid priority indication [act 520]. Here, the PVQ 235 may determine whether a priority value is stored in the PF tag field 430 of the PF buffer 352 and that the tag-hit field 410 indicates that the priority value is valid. If the PVQ 235 determines that a valid priority value is stored in the PF tag field 430, the PVQ 235 assigns the stored priority to the corresponding data frame [act 530].

If, on the other hand, the PVQ 235 determines that the PF tag field 430 does not contain a valid priority value, the PVQ 235 may determine if the IRC buffer 354 contains a valid priority indication [act 540]. Here, the PVQ 235 may determine whether a priority value is stored in the IRC priority field 470 of the IRC buffer 354 and that the IRC-hit field 440 indicates that the priority value is valid. If the PVQ 235 determines that a priority value is stored in the IRC priority field 470, the PVQ 235 assigns the stored priority to the corresponding data frame [act 550].

If the PVQ 235 determines that neither the PF buffer 352 nor the IRC buffer 354 contains a valid priority indication, the PVQ 235 may assign a low priority to the corresponding data frame [act 560]. After the PVQ 235 has assigned a priority to the corresponding data frame, the PVQ 235 may transfer the data from the register 350 to the appropriate output queue based on the priority [act 570].

Described has been a system and method for assigning priority values to data frames in a network device. An advantage of the present invention includes the ability to determine priority for a data frame when the network device may have assigned different levels of priority to the data frame.

Only the preferred embodiments of the invention and a few examples of its versatility are shown and described in the present disclosure. It is to be understood that the invention is capable of use in various other combinations and environments and is capable of modifications within the scope of the inventive concept as expressed herein. For example, while the PVQ has been described as performing the priority determination, it will be appreciated that the priority determination may be performed by another logic device in the multiport switch. Moreover, while several port filters were illustrated in FIG. 3, it will be appreciated that implementations consistent with the present invention are equally applicable to network devices having one port filter. Also, while a series of acts has been described with respect to FIG. 5, the order of the acts may be varied in other implementations consistent with the present invention. No element or act used in the description of the present application should be construed as critical unless explicitly described as such.

The scope of the invention is defined by the claims and their equivalents.

What is claimed is:

1. A method for determining priorities in a network device having a receiver and a forwarding engine, comprising:
   receiving first data from the receiver and second data from the forwarding engine, the first and second data relating to a data frame received by the network device;
   determining whether the first data contains first priority data;
   assigning a first priority to the data frame based on the first priority data when the first data contains the first priority data;
   determining, when the first data does not contain the first priority data, whether the second data contains second priority data;
   assigning a second priority to the data frame based on the second priority data when the second data contains the second priority data; and
   assigning, when the second data does not contain the second priority data, a low priority to the data frame.

2. The method of claim 1 further comprising:
   merging the first and second data into a register.

3. The method of claim 2 further comprising:
   transferring the merged first and second data to an output queue based on the assigned priority.

4. The method of claim 1 wherein the determining whether the first data contains first priority data includes:
   determining whether the first priority data is valid, and
   wherein the determining whether the second data contains second priority data includes:
   determining whether the second priority data is valid.

5. The method of claim 1 wherein the first data includes a first field to store validity information, a second field to store a frame pointer, and a third field to store the first priority.

6. The method of claim 5 wherein the second data includes a first field to store validity information, a second field to store a forwarding engine frame pointer, a third field to store forwarding information, and a fourth field to store the second priority.

7. A network device comprising:
   a port filter to receive a data frame and generate first data relating to the data frame;
   a first logic device to generate second data for the received data frame; and
   a second logic device to receive the first data and the second data, determine whether the first data contains a valid first priority value, assign the valid first priority value to the data frame when the first data contains the valid first priority value, determine, when the first data does not contain a valid first priority value, whether the second data contains a valid second priority value, and assign the valid second priority value to the data frame when the second data contains the valid second priority value.

8. The network device of claim 7 wherein the second logic device:
   assigns, when the second data does not contain the valid second priority value, a low priority value to the data frame.

9. The network device of claim 7 wherein the second logic device:
   merges the first and second data into a register.

10. The network device of claim 9 further comprising:
    a plurality of output queues associated with different levels of priorities, and
    wherein the second logic device:
    transfers the merged first and second data to one of the plurality of output queues based on the assigned priority value.

11. The network device of claim 7 wherein the second logic device comprises:
    a register that is associated with the port filter and stores the first and second data.

12. The network device of claim 7 wherein, when determining whether the first data contains a valid first priority value and when determining whether the second data contains a valid second priority value, the second logic device:
    determines that the priority value in the first and second data is valid based on validity information in the first and second data.

13. The network device of claim 7 wherein the first logic device includes a forwarding engine.

14. The network device of claim 7 further comprising:
    a plurality of transmitters to transmit the data frame based on the assigned priority value.

15. The network device of claim 7 wherein the first data includes a first field to store validity information, a second field to store a frame pointer, and a third field to store the first priority value.

16. The network device of claim 7 wherein the second data includes a first field to store validity information, a second field to store a frame pointer, a third field to store forwarding information, and a fourth field to store the second priority value.

17. A system for assigning priorities to packets, comprising:
    a plurality of receiver modules to receive packets and generate first data relating to the packets;
    first logic to generate second data for the packets;
    a plurality of registers that corresponds to the receiver modules and stores the first and second data for the packets received by the corresponding receiver modules; and
    second logic to determine, for each of the packets, whether the first data includes a priority indication, assign the priority indication to the packet when the first data includes a priority indication, determine whether the second data includes a priority indication when the first data is determined not to include the priority indication, assign the priority indication from the second data to the packet when the second data is determined to include the priority indication, and assign a low priority indication to the packet when the second data is determined not to include the priority indication.

18. The system of claim 17 wherein the second logic:

transfers the first and second data to an output queue based on the assigned priority indication.

19. The system of claim 17 further comprising:

a transmitter to transmit the packet based on the assigned priority indication.

* * * * *